(12) United States Patent
Taylor et al.

(10) Patent No.: US 7,982,140 B2
(45) Date of Patent: Jul. 19, 2011

(54) DIFFERENTIAL WEIGH SCALE AND METHOD OF USE

(76) Inventors: Susan Taylor, Kitchener (CA); William Edgar, Kitchener (CA)

( * ) Notice: Subject to any disclaimer, the term of this patent is extended or adjusted under 35 U.S.C. 154(b) by 232 days.

(21) Appl. No.: 12/190,678

(22) Filed: Aug. 13, 2008

(65) Prior Publication Data

US 2009/0044987 A1 Feb. 19, 2009

Related U.S. Application Data

(60) Provisional application No. 60/955,903, filed on Aug. 15, 2007.

(51) Int. Cl.
*G01G 19/44* (2006.01)

(52) U.S. Cl. ................................. 177/25.19; 128/921

(58) Field of Classification Search .............. 177/25.16, 177/25.19; 128/921
See application file for complete search history.

(56) References Cited

U.S. PATENT DOCUMENTS

| | | | |
|---|---|---|---|
| 3,655,003 A * | 4/1972 | Yamajima | 177/173 |
| 4,366,873 A | 1/1983 | Levy et al. | |
| 4,423,792 A | 1/1984 | Cowan | |
| 6,538,215 B2 | 3/2003 | Montagnino et al. | |
| 6,590,166 B2 * | 7/2003 | Yoshida | 177/25.13 |
| 6,617,530 B1 | 9/2003 | Lin | |
| 6,679,854 B2 * | 1/2004 | Honda et al. | 600/587 |
| 6,781,067 B2 * | 8/2004 | Montagnino et al. | 177/25.13 |
| 7,265,301 B2 | 9/2007 | Simberg | |
| 2002/0134589 A1 * | 9/2002 | Montagnino et al. | 177/25.16 |
| 2005/0006152 A1 | 1/2005 | Eldeiry | |
| 2006/0006005 A1 * | 1/2006 | Dumornay et al. | 177/25.13 |
| 2009/0178858 A1 | 7/2009 | Daniels et al. | |

OTHER PUBLICATIONS

International Searching Authority, International Search Report, Nov. 18, 2008, PCT/CA2008/001473.
International Searching Authority, The Written Opinion of the International Searching Authority, Nov. 18, 2008, PCT/CA2008/001473.
Weight Loss Oberver, Mary Lou's Weigh Launched, Jun. 21, 2008, http://weightlossobserver.com/2008-06-21/g10404_Mary-Lous-Weigh-Launched/.

* cited by examiner

*Primary Examiner* — Randy W Gibson
(74) *Attorney, Agent, or Firm* — Neil Henderson (57) ABSTRACT

A weigh scale including a weighing mechanism; a recording system connected to the weighing mechanism for recording a weight; a comparator connected to the weighing mechanism and the recording mechanism for determining a difference between weights; and an indicator in communication with the comparator for indicating a difference in weights, wherein the weighing mechanism, recording system, comparator and indicator are configured to: measure an initial weight of a subject without indicating the weight and store the weight in the recording system; measure a subsequent weight of the subject without indicating the weight; determine a difference between the initial weight and the subsequent weight; and indicate the difference in weight between the initial weight and the subsequent weight only when the subsequent weight is one of greater or less than the initial weight.

20 Claims, 4 Drawing Sheets

DIFFERENTIAL WEIGH SCALE AND METHOD OF USE

RELATED APPLICATION

This application claims priority to U.S. Provisional App. No. 60/955,903, filed Aug. 15, 2008, the content of which is hereby incorporated herein by reference.

FIELD

This application relates to weigh scales, and in particular to apparatuses and methods of weighing subjects and monitoring the weight of subjects.

BACKGROUND

People use weigh scales to measure how much they weigh. This is particularly true of people who are on diets. However, stepping on a scale and viewing how heavy you truly are can be a daunting experience. Weighing oneself can lead to adverse psychological effects. For some people, a weigh scale generates fears of embarrassment, humiliation, discouragement and the general feeling of being overwhelmed.

The stigma attached to a person's weight can be burdensome. Knowing exactly how heavy you are can have dwindling effects on your self-confidence, especially after looking down at the scale time and time again. Some people avoid stepping on a scale altogether in fear of finding out exactly how much they weigh. In fact, celebrities such as Oprah Winfrey and Dr. Phillip McGraw's wife openly admit to the fear of stepping on the scale. Some people on diets might not want to monitor their progress for fear that their total weight is still quite large in some cases, when a person finally steps on a scale they may be so discouraged by their previous dieting efforts that they may altogether stop watching their weight This may lead to a rebound period where a person gorges oneself on food, which ultimately exacerbates the weight problem they intended to confront.

These emotional issues can be hard for everyone, especially children. For example, a child may have a more acute sense of fear as compared to an adult and the child may have an exaggerated sense of shame, failure, or trauma. While weigh scales are generally supposed to be a helpful tool in gaining or losing weight, their very nature tends to create fear, doubt, and uneasiness in a person's mind.

Accordingly, there is a need for improved apparatuses, systems and methods for weighing subjects and for monitoring the weight of subjects.

SUMMARY

According to one aspect of an improved weigh scale, there is provided a weigh scale comprising: a weighing mechanism; a recording system connected to the weighing mechanism for recording a weight; a comparator connected to the weighing mechanism and the recording mechanism for determining a difference between weights; and an indicator in communication with the comparator for indicating a difference in weights, wherein the weighing mechanism, recording system, comparator and indicator are configured to: measure an initial weight of a subject without indicating the weight and store the weight in the recording system; measure a subsequent weight of the subject without indicating the weight; determine a difference between the initial weight and the subsequent weight; and indicate the difference in weight between the initial weight and the subsequent weight only when the subsequent weight is one of greater or less than the initial weight.

It will be understood that the improved weigh scale allows a subject to monitor the progress of a diet or weight-gain plan by focusing on successes (i.e. being notified of a loss (diet) or gain (weight-gain program) rather than on their total weight. Alternatively, those motivated by negative reinforcement may wish to reverse this option and only be notified of failures.

In a particular cases the weighing mechanism, recording system, comparator and indicator may be further configured to indicate an encouraging message when the subsequent weight is the other of greater than or less than the initial weight.

In a further particular case, the weighing mechanism, recording system, comparator and indicator may be further configured to prevent the measuring of a subsequent weight until a predetermined time has elapsed.

In yet a further particular case, the weighing mechanism, recording system, comparator and indicator may be further configured to indicate the difference in weight using a non-numerical system.

In a further particular case, the weighing mechanism, recording system, comparator and indicator may be further configured to indicate the difference in weight using a non-numerical system only until a predetermined value is reached.

In still yet a further particular case, the weighing mechanism, recording system, comparator and indicator may be further configured to reset the initial weight to a new value on reaching a predetermined difference in weight.

In another particular case, the indicator may be provided remotely from the weighing mechanism.

According to another aspect of embodiments herein, there is provided a method of monitoring a weight of a subject, the method comprising: measuring an initial weight of the subject without indicating the weight; measuring a subsequent weight of the subject without indicating the weight; determining a difference between the initial weight and the subsequent weight; and indicating the difference in weight between the initial weight and the subsequent weight only when the subsequent weight is one of greater or less than the Initial weight.

In a particular case, the method may include, when the subsequent weight is the other of greater than or less than the initial weight, indicating an encouraging message.

In another particular case, the method may include preventing the measuring of a subsequent weight until a predetermined time has elapsed.

In yet another particular case, the method may include indicating the difference in weight using a non-numerical system.

In another particular case, the method may include indicating the difference in weight using a non-numerical system only until a predetermined value is reached.

In still yet another particular case, the method may include resetting the initial weight to a new value on reaching a predetermined difference in weight.

According to another aspect of embodiments herein, there is provided a computer-readable medium storing executable program instructions, wherein the executable program instructions, when executed by a computer processor, cause the processor to: measure an initial weight of the subject without indicating the weight; measure a subsequent weight of the subject without indicating the weight; determine a difference between the initial weight and the subsequent weight; and indicate the difference in weight between the initial weight and the subsequent weight only when the subsequent weight is one of greater or less than the initial weight.

In a particular case, the computer-readable medium may include instructions which cause the processor to indicate an encouraging message when the subsequent weight is the other of greater than or less than the initial weight.

In another particular case, the computer-readable medium may include instructions which cause the processor to prevent the measuring of a subsequent weight until a predetermined time has elapsed.

In yet another particular case, the computer-readable medium may include instructions which cause the processor to indicate the difference in weight using a non-numerical system.

In still yet another particular case, the computer-readable medium may include instructions which cause the processor to indicate the difference in weight using a non-numerical system only until a predetermined value is reached.

In a further particular case, the computer-readable medium may include instructions which cause the processor to reset the initial weight to a new value on reaching a predetermined difference in weight.

In yet a further particular case, the computer-readable medium may include instructions which cause the processor to send one of the subsequent weight or the difference in weight to an electronic patient record.

FIGURES

The drawings included herewith are for illustrating various examples of articles, methods, and apparatuses of the present specification and are not intended to limit the scope of what is taught in any way. In the drawings.

DESCRIPTION

Numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein. The embodiments described herein are not intended to be limited to the specific details of any one example embodiment or to specific details that may be common to multiple, or all, example embodiments. The applicants, inventors or owners reserve all rights that they may have in any embodiments disclosed herein, for example the right to embodiments claimed in a continuing application, and do not intend to abandon, disclaim or dedicate to the public any such embodiments by disclosure of this document.

Typically, the principal purpose of conventional scales is to indicate how much a person actually weighs. However, telling someone their weight can diminish their self-confidence. For example, people on a diet may be discouraged from continuing their diet once they realize how heavy they are. The focus of this application is on indicating a change in weight instead of an absolute or total weight. By indicating a person's change in weight and not indicating their total weight a person can be motivated and encouraged, for example, to continue their diet. Indicating weight change in this fashion gives people the choice to know their weight change without having to know how much they actually weigh.

Indicating weight change and not total weight can also be helpful in reducing the social stigmas or taboos surrounding a person's weight. For example, the social stigma may be generated when a first person that uses conventional scales expresses wonder as to why a second person does not like to use conventional scales. For example, the first person may ask why the second person, who may be on a diet, wouldn't want to step on a weigh scale to measure their total weight, even if the second person is making noticeable progress in their diet. What the first person may not understand is that society generally sets a psychological benchmark for total weight according to the average weight of certain people, for example people that may be recognized as skinny, slim or generally lighter in weight. Everyone else generally evaluates their total weight in reference to that benchmark. When a person realizes how far away they are from that benchmark, they may give up on dieting and exercising, or may otherwise lose confidence in oneself. For example, society has generally put an increasing pressure on women to maintain certain weights, which are generally unattainable for at least some women. For these women, the realization that they cannot attain the benchmark weight can instill fear and dread of embarrassment, humiliation, discouragement and the general feeling of being overwhelmed. This fear, dread and feeling may lead to loss of self-confidence, stopping a diet or exercise program, gorging on food, or other similar effects. These effects are not limited to women, for example, some obese male adults and young boys may have similar fears and dread relating to their weight. As such, indicating weight change and not total weight can remove this psychological need to compare your weight to another person's weight. As people generally lose knowledge of their own total weight they are then unable to compare their total weight to the psychological benchmark. In this sense, the weigh scales and methods described herein promote a form of self-comparison, which is intended to be a psychologically healthier approach to weight management. In particular, the weigh scales and methods described herein can be particularly beneficial for children. For example, when considering the growing obesity rate among children and the general need for these children to continue healthy dietary habits and exercising habits. Furthermore, the psychological benefit(s) may have a greater impact on some children who may have a more acute sense of fear as compared to an adult and the child may have an exaggerated sense of shame, failure, or trauma. In these cases the weigh scales and methods described herein may alleviate that child's sense of fear, shame, failure and/or trauma, for example, that arise when the child knows their own total weight, or when the child compares their total weight to other people.

Figure 1:
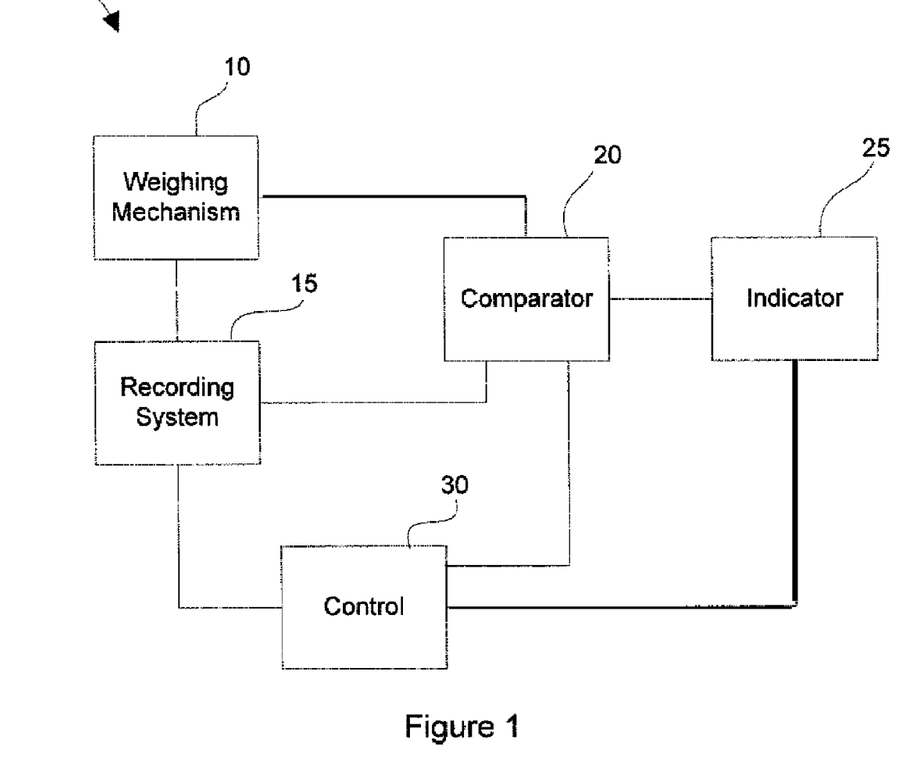
FIG. 1 is a schematic diagram of a weigh scale.

FIG. 1 shows a schematic diagram of a weigh scale 100. In the embodiment shown in FIG. 1, the weigh scale includes a weighing mechanism 10, which may include a spring scale, a digital scale, or another weighing mechanism known in the art, a recording system 15 that receives and records an input from the weighing mechanism indicating an initial weight, a comparator 20 to compare a recorded weight to a current (subsequent) weight, and an indicator 25 to display or otherwise indicate a result to a user. The weigh scale will also generally have a control system 30 to allow resetting of the recording system 15, to adjust the indicator 25, or to handle other control functions and settings, such as user configuration or the like. In some embodiments, the control system 30 may be a computer processor (not shown) programmed to control the weigh scale 100.

Figure 2:
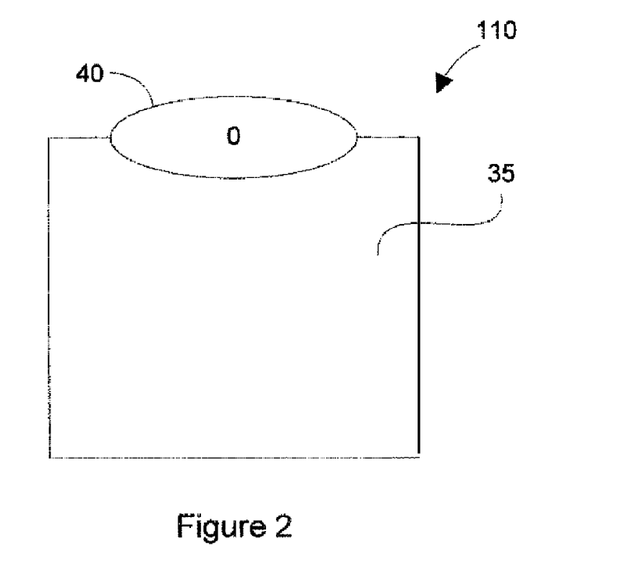
FIG. 2 is a plan view of a digital scale.

FIG. 2 illustrates an example digital weigh scale 110. The digital weigh scale 110 includes all the elements of the weigh scale 100 above. In this embodiment, the control system 30 is preferably a computer processor (not shown) programmed to control the weigh scale 110. Further, the control system 30 may also act as the comparator 20 and control the indicator 25. As shown, the weighing mechanism 10 (not shown in FIG. 2) is generally connected to a platform 35, which is generally located above the weighing mechanism 10. In this case, the indicator 25 is a display 40 that is generally placed on the platform 35 for viewing by a subject/ user (not shown). The subject stands on the platform 35 and the weighing mechanism 10 measures the person's total weight. In the embodiments herein, the measured total weight is generally never indicated to the person.

As noted above, the weigh scale 100/110 also includes a recording system 15 in communication with the weighing mechanism 10. When the weighing mechanism 10 first measures the person's weight, or upon using a control system 30 to reset the weigh scale, by, for example pushing a button or switch or the like, the recording system 15 records the person's total weight as an initial weight. In some examples, the recording system 15 may be a computer memory (not shown) and the control system 30 may digitally store the person's initial weight within the computer memory or the like. In some cases, the recording system 15 may be configured to allow access to the person's recorded initial weight at some time in the future. However, in most cases, the recording system 15 will be configured such that person's total weight is never indicated to the person.

After recording a user's initial weight, a user may subsequently weigh oneself using the weigh scale. The weighing mechanism 10 then measures the user's total weight as a subsequent weight, but generally does not indicate the total weight to the user. The comparator 20 receives a recorded weight from the recording system 15 and a current (subsequent) weight from the weighing mechanism 10 and outputs a measure of the change in weight. In some examples, the comparator 20 may be the control system 30 described above. The indicator 25 then indicates, (i.e. informs) the user whether their weight has changed and, in some embodiments, the amount of the change. It will be understood from the following that the indicator may be a visual display, audio speaker, remote display, or any other type of indicator that may be known in the art.

Figure 3:
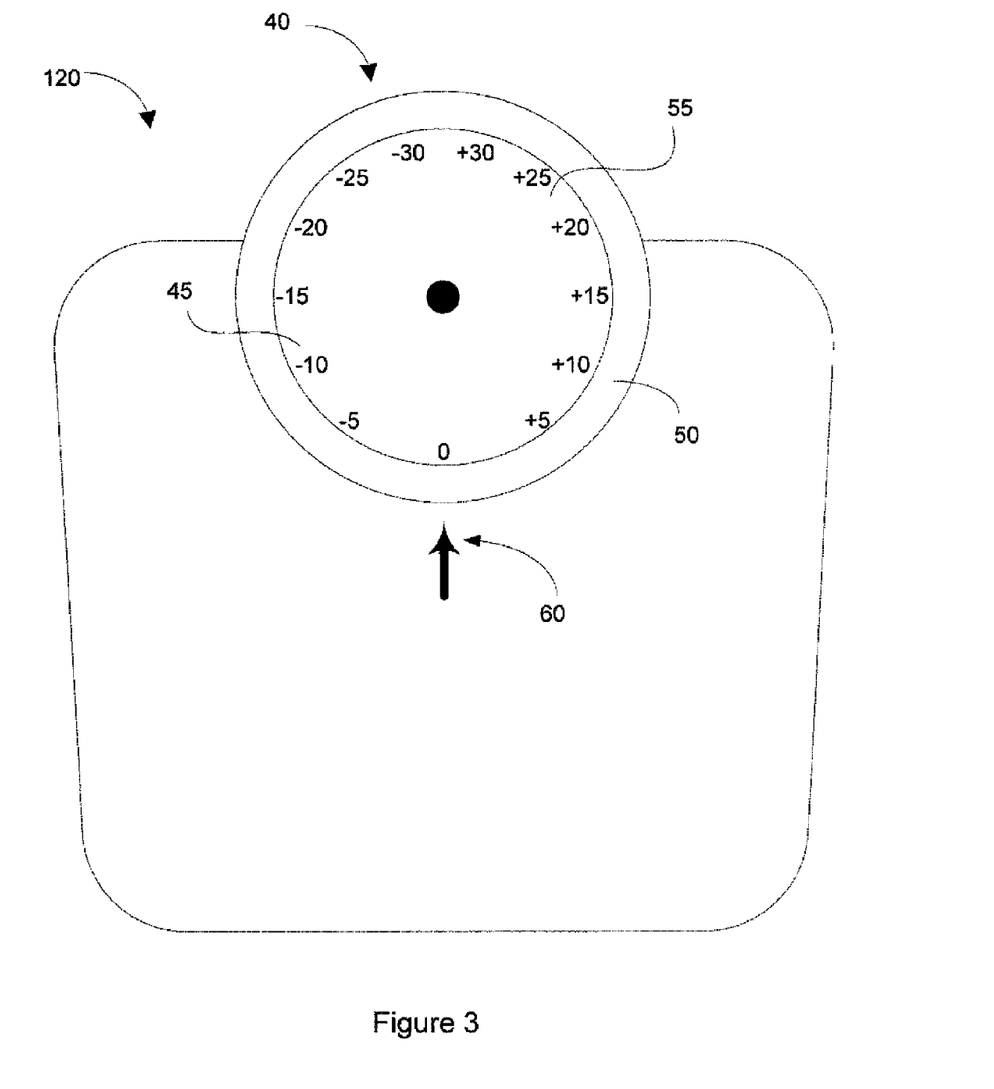
FIG. 3 is a plan view of a spring scale.

Referring to FIG. 3, there is another example of a weigh scale 120. In this case, the weigh scale 120 is a spring scale instead of a digital scale.

Conventional spring scales generally operate using a spring that elastically deforms in relation to the person's weight when they stand on the platform of the weigh scale. The elastic deformation of the spring may rotate a disc connected to the spring. For example the spring may be connected to the disc via a rack and pinion gear system as known in the art. The disc generally includes graduations that correspond with the total weight of the object placed on the platform. When the disc stops rotating, a visual marker points to one of the graduations on the disc in order to indicate the total weight of the person Generally, the visual marker is an arrow affixed to the weigh scale in an absolute position relative to the weigh scale, such that when the disc rotates, the arrow remains in a fixed position. Thus, as the disc rotates, the arrow points to different graduations on the disc and once the disc stops, the arrow generally points to the graduation corresponding to the total weight of the person.

In the example illustrated in FIG. 3, the disc 40 includes graduations 45 corresponding to a person's change in weight as opposed to the person's total weight. For example, the graduations 45 may include positive graduations and negative graduations, for example that begin at negative-thirty (−30) kilograms and increase to positive-thirty (+30) kilograms. Generally, there is a zero (0) kilogram graduation between the positive graduations and the negative graduations.

Furthermore, the graduations 45 can generally be reoriented with respect to the disc 40 independent of the elastic deformation of the spring. For example, the disc 40 may comprise a pallet 50 and a top plate 55 that releasably engages with the pallet 50, for example, in a similar fashion as a clutch plate. Accordingly, the top plate 55 may engage the pallet 50 in a first position, and may disengage/float over the pallet 50 in a second position. In either position, there may be a locking mechanism to keep the top plate 55 in that specific position. For example, the locking mechanism may be a latch or a magnet. The reorientation, engaging, disengaging and locking of the top plate 55 and pallet 50 generally corresponds to the recording system and comparator described above.

In operation, when a user wants to record their initial weight, they generally disengage the top plate 55 so that it floats over the pallet 50 in the second position. The user may then step on the scale to record their initial weight. Since the graduations 45 do not correspond to the total weight on the scale, the user will generally be unaware of their total weight as measured by the weigh scale 120 Next the user or another person generally re-orients the top plate 55 such that the zero-graduation is aligned with the visual marker 60 (in this case an arrow, providing the function of the indicator 25). At this point, the user or the other person generally engages the top plate 55 with the pallet 50 in the first position. The user may also lock the top plate 55 in the first position using the locking mechanism. This generally completes the recording of the initial weight. Subsequently stepping on the weigh scale 120 generally rotates the disc and graduations to a specific rotational position that corresponds to the user's change in weight. For example, if the user's weight did not change, the disc 40 generally rotates such that the visual marker 60 points to zero. If the user's weight increased five pounds, the disc 40 generally rotates such that the visual marker 60 points to positive-five (+5). If the user's weight decreased five pounds, the disc 40 generally rotates such that the visual marker 60 points to negative-five (−5). Accordingly, the user can use the weigh scale 120 to determine their change in weight without knowing their total weight.

Figure 4:
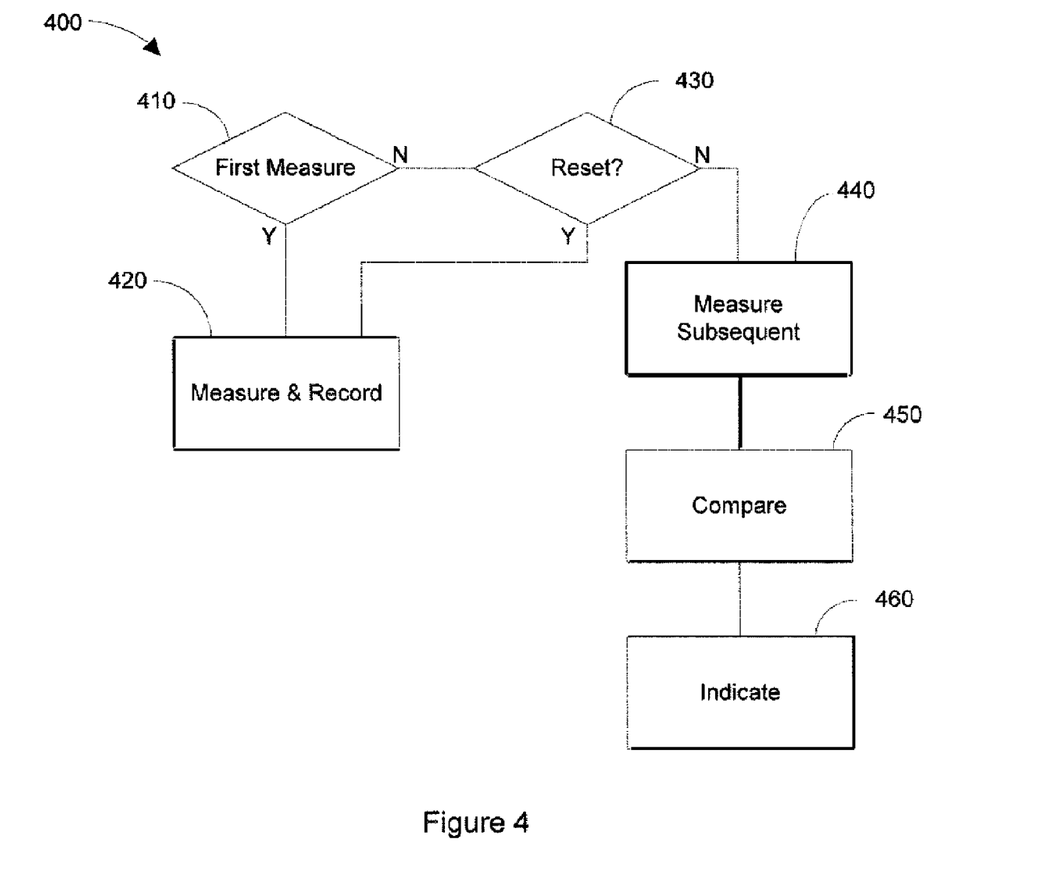
FIG. 4 is a flowchart of a method of monitoring a subject's weight that can be implement using, for example, the weigh scale of FIG. 1.

FIG. 4 is a flowchart 400 illustrating an embodiment of a method of monitoring a weight of a subject. The method includes determining if this is the first weight measurement being made (410). If so, the user's weight is measured and is recorded (420) without indicating the initial weight to the person. In some cases, the weigh scale will indicate that a weight has been recorded, for example by flashing "0" or the like. If it is not a first measure, it is determined if a reset has been requested (for example, based on a button input or the like) (430). If a reset has been requested, a new weight is measured (420) and recorded (430) without indicating the new initial weight to the person. If a reset is not requested, a new subsequent weight is measured (440), without indicating the subsequent weight to the person. The subsequent weight is then compared with the recorded (initial) weight (450), to determine or generate a change in weight. The change in weight is then indicated (460).

Generally the change in weight is indicated to the subject/person being weighed however, the change in weight may be indicated to another person, such as a physician or a dietitian. In some embodiments, particularly those for use in a medical environment, the indicator 25 may be provided remotely from the weighing mechanism 10 such that the subject will step on the weigh scale 100 and the subject's weight or change in weight will be transmitted in a wired or wireless fashion to a remote display (not shown) for viewing by a doctor or other professional. In some cases, the weight or change in weight may be transmitted to an electronic patient record or the like via a wired or wireless network. The fact that the weight or change in weight is not shown at the same place as the subject being weighed may relieve some of the psychological pressure of having a weight displayed in front of the subject or a nurse or the like and make the weigh-in experience easier for the subject.

In some examples, the indication of the change in weight may be made using numerical values and in others the change may be indicated using non-numerical progress indicators. For example, the comparator and indicator may output that the user is making "fair", "good" or "excellent" progress if they have lost weight, or that the person needs to "be vigilant" if they have gained weight. In some examples, the indicator may indicate a change in weight using symbols, beeps, pictures, music, flashing lights, colour codes, or other indicators. Regardless of how the indicator indicates the person's change in weight, generally the user is not informed of their total weight. In still further examples, the indicator may be restricted to indicating only one of a gain or a loss. For example, in the case a subject that is dieting, the indicator may only provide an indication when the subject has lost weight (i.e. only indicating when the subject's current weight is less than the recorded weight). Alternatively, again in a dieting case, the indicator may indicate a numerical value when the subject has lost weight but use non-numerical indicators when there has been a gain. This type of reinforcement of only showing "good" results and providing non-numerical encouraging indicators for "bad" results can encourage some subjects to focus on diet goals. It will be understood that some subject/users may prefer to only know about failures ("bad" results) in order to provide encouragement when they do not maintain their diet. This option may be provided to the subject/user as a configuration choice.

In some examples, such as when using a digital scale, the indicator 25 may include a digital display, such as an LCD screen or the like that is in communication with the comparator 20 or control system 30. In a digital display, the display may more easily indicate the change in the person's weight via numerics or alphanumerics, for example as a positive or negative number or as an indicator of progress, such as "E" for excellent or the like, as described above. In other examples, the indicator 25 may include an audio speaker in communication with the comparator 20 or control system 30. The audio speaker may indicate the change in the person's weight, for example via a voice message or via music or the like. In some examples the indicator 25 may include both the display and the audio speaker. Still further, the display may indicate a numerical value while the audio speaker may provide progress encouragement as described above, or vice versa. Furthermore, the display and the audio speaker may be used to in conjunction with progress indications instead of, or in combination with, the numerical change in weight. Again, these alternative types of indications may provide additional motivational messages to the subject without the direct knowledge of the subjects weight. This may keep the subject's mind on the goals rather than on the current total weight.

When indicating a user's change in weight, the weigh scale may be configured to only indicate an actual numerical value in predetermined increments, such as, for example, 0.25 kg, 0.5 kg or 1 kg, and, if the predetermined increment is not reached as yet, the indication could be a non-numerical motivational indicator, such as "Just a little more", "Try Harder", cheerful music, or the like. Alternatively, for a smaller display, the indication could be "OK" when weight has been lost but the predetermined increment has not been reached or could be "NG" (no good) when weight has been gained, rather than saying how much up or down the change actually is. In this way, the subject does not need to worry about smaller ups or downs in weight that may occur on a daily basis but can focus on larger desired goals.

Recent scales have also included the capability of determining body fat percentage. It will be understood that, in some embodiments the weighing mechanism 10 may be or may also include a body-fat mechanism that determines the body-fat percentage for the subject. In particular, it will be understood that the term "weighing mechanism" used herein is intended to encompass weight or body-fat percentage or a combination depending on the type of weigh scale involved. In the case of body-fat percentage measurement, the indication described above may relate to a change in body fat percentage, either in addition to or as an alternative to change in weight. Preferably, the user can configure which type and form of indication they would prefer.

In another alternative embodiment, the weigh scale 100 may include a clock/timer (not shown) that will allow the weigh scale 100 to also track the amount of time between checking weight. In this case, the indication can include the amount of time it took to arrive at the current weight change or to reach a goal. The indication may also include a graph that is displayed or runs across a display showing weight changes over time, such as by showing each day and the corresponding weight loss or gain recorded on that day. Such a graph can show a trend in weight loss or weight gain even though there may be some daily fluctuations.

In this embodiment, the weigh scale 100 may also be configured to determine if there is an unusual weight loss or gain with regard to previous measurements over a similar time period. An unusual weight loss or gain could be indicated to a user in one of the manners noted above, i.e. by visual or audio display, including, for example by a graph that runs across a display showing weight changes over time and highlighting the unusual weight loss or gain. Such information may be useful to a subject in determining the effect of a particular dietary change or in monitoring for possible health issues.

In order to configure and operate the weigh scale 100 without needing to bend down and adjust buttons or other inputs on the weigh scale 100 itself, the weigh scale 100 may preferably be provided with a raised control panel or with a remote control that allows the user to configure or operate the weigh scale 100. The provision of a raised control or remote provides easier access to the scale and makes the weigh-in process much more convenient which may provide further motivation.

In further embodiments, the weigh scale 100 may include a locking system that prevents a user from re-weighing themselves for a predetermined period of time after a previous weighing. For example, once the user has used the weigh scale 100 to check their change in weight they would be required to wait for a period of, for example, 12, 24, 48 hours before the scale would provide a result again. In this way, the user would not feel compelled to check weight as frequently and can focus on other matters such as nutrition and exercise, providing additional motivation. It will be understood that the predetermined time period may be configurable by the user.

After a period of time, a person may also want to reset their initial weight. Accordingly, the weigh scale 100 may include a reset system (not shown) in communication with the recording system 15. In some examples, the reset system may be a reset button or switch located on the platform 35 of the weigh scale 110. Depressing the reset button may reset the recording system 15, for example by clearing the memory of the microcontroller. After the memory is reset, the person may re-record their initial weight as described above. In some cases, the reset button may be the same button used to record the initial weight and may be activated by holding the reset button for a predetermined time or the like. As an alternative, the weigh scale 100 may be configured to automatically reset the stored actual weight when a particular goal is met. For example, when a user reaches a goal of losing 2 kg or the like, the weigh scale 100 may be configured to record the new weight at that time as the base weight, such that future weighings will be compared to the new base weight. This feature may be configured to be automatic, query a user prior to reset, and may also have various goal settings available. The user may choose a preset or self determined predetermined goal weight change or goal weight.

Figure 5:
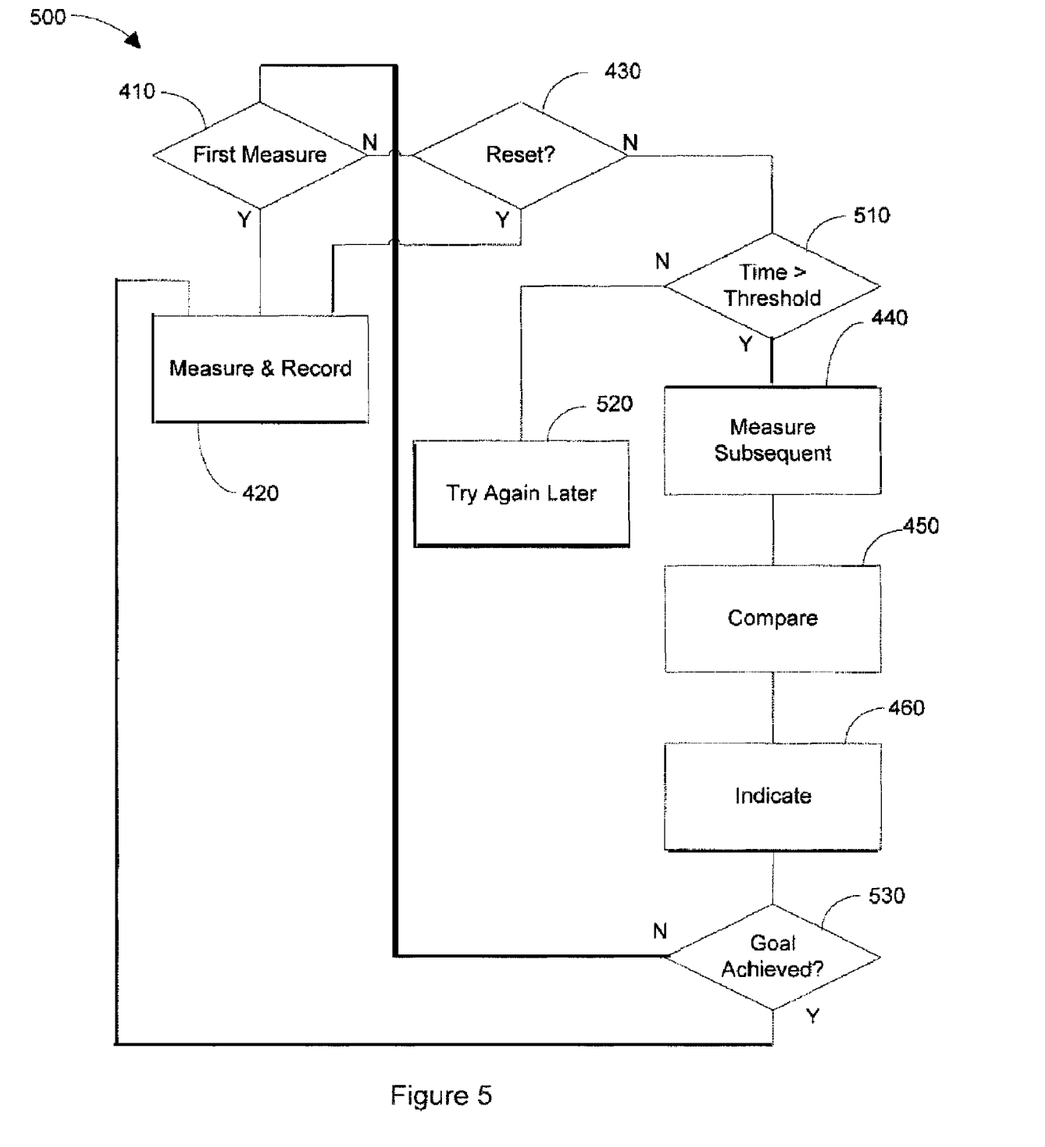
FIG. 5 is a flowchart of another method of monitoring a subject's weight that can be implement using, for example, the weigh scale of FIG. 1.

FIG. 5 is a flowchart 500 illustrating another embodiment of a method of monitoring a weight of a subject. The method includes several elements that are similar to those in the flowchart 400 of FIG. 4 and similar reference numbers will be used for these elements. The method begins by determining if this is the first weight measurement being made (410). If so, the user's weight is measured and is recorded (420) without indicating the initial weight to the person. In some cases, the weigh scale will indicate that a weight has been recorded, for example by flashing "0" or some other type of indication. If it is not a first measure, it is determined if a reset has been requested (for example, based on a button input or the like) (430). If a reset has been requested, a new weight is measured (420) and recorded (430) without indicating the new initial weight to the person. If a reset is not requested, there is then a check to determine if a time greater than a predetermined threshold has passed since the last weighing (510). If not, then the subject is told to try again later (520), possibly together with an indication of the time remaining before reweighing. If sufficient time has passed, a subsequent weight is measured (440), without indicating the subsequent weight to the person. The subsequent weight is then compared with the recorded (initial) weight (450), to determine or generate a change in weight. The change in weight is then indicated (460). There is then a determination as to whether or not a goal has been achieved (530), for example a loss of 2 kg. If so, the new weight is recorded and used as a base for future weight comparisons (420). If a goal has not been achieved, the method returns to the beginning (410). It will be understood that the checking of the time being sufficient (510) may occur in other positions in the flowchart, for example in advance of 430 in order to prevent a user from resetting in order to overcome the ability to weigh oneself more frequently.

While the examples above describe use by a single person, the weigh scale 100 may be configured for use by a plurality of people. For example, the recording system 15 may have the ability to record the total weight of each of one or more people, for example, who may live within the same household. As such, the weigh scale 100 may include a plurality of inputs (e.g. buttons) associated with a profile for each person who uses the weigh scale. For example, there may be four buttons, each associated with an individual profile. In use, pressing a first button may activate a first recording 15 system associated with a first profile. For example, pressing the first button may allow a person to record their initial weight within the first recording system 15, which generally occurs when the first recording system 15 does not have an initial weight recorded. As described above, an initial weight may be recorded if the first profile is being used for the first time, or if the reset button has been depressed after accessing the first profile. After recording the initial weight in the first recording system 15, subsequently depressing the first button can activate the first profile for comparing a new weight to the initial weight recorded in the first recording system. The second, third and fourth buttons may operate in a similar manner and may be associated with second, third, and fourth profiles and recording systems 15 respectively.

In some examples, the weigh scale 100 may be designed to have a shape and body that compliments the idea of not indicating total weight. For example, the weigh scale 100 may be in the shape of an apple, a pear, other fruits, a toy car (i.e. for children), a cloud, a clown, a monkey, a pirate, or other generally unfamiliar shapes unrelated to conventional scales. These and other similar shapes are generally intended to evade the familiar bad impressions associated with weigh scales that are generally used for medical and other similar purposes. For example, the typical square, rectangular, or generally quadrilateral shape of a conventional medical weigh scale may instill fear of embarrassment, humiliation, discouragement and the general feeling of being overwhelmed. In this sense, the conventional medical weigh scale may be considered a symbol of potential failure. By providing a weigh scale 100 with an unfamiliar shape, for example a shape that compliments the idea of not indicating total weight, may provide psychological benefits, such as reducing the fear of embarrassment, humiliation, discouragement or the general feeling of being overwhelmed. Providing a weigh scale 100 with an unfamiliar shade may encourage and motivate a person, for example to use the weigh scale 100, continue a diet, or may provide other psychological benefits.

In some embodiments, the weigh scale 100 may be provided with an indicator 25 that may be physically adjusted to allow for blocking of the indication of change in weight. For example, the indicator 25 may be provided with a sliding cover that can be used to cover the indicator if the subject does not want to view the change in weight. Alternatively, the indicator 25 may be on a swivel or the like such that the indicator can be turned away from the subject. Such a feature may be particularly useful in a weigh scale for use in a medical setting wherein the weight data is also sent to a remote system so that the subject may have the option of knowing the change in weight. In a further alternative, the indicator 25 which is a visual display may have two sides, one of which displays change in weight and the other of which displays total weight. A subject may then have the option of physically moving the indicator 25 depending on the information that they would like to have.

In a further embodiment of the weigh scale 100, the indication provided to the user may be via a printout rather than or as well as by a display, audio or the like. In this embodiment, the weigh scale or remote control or the like can be provided with a printer of the type that can be found on portable credit card units or the like. In this way, the user can receive a discrete indication of their change in weight. In some cases, the change in weight or the actual weight may be on the printout and the user may choose to review the weight or discard the paper The printout may also be selectable as an option for the user. Again, this feature may be particularly useful in a medical/health care setting. This feature provides the subject with further options to monitor progress or weight and may provide additional motivation, In the examples described above, while a person's total weight may be measured, recorded, stored in memory and used to track and display weight gain or loss, the weigh scales and methods generally do not indicate the person's total weight Accordingly, the weigh scales and methods described herein are generally intended to monitor a person's weight by tracking weight loss or weight gain, and indicate only a change in weight to a person and preferably only a favourable change in weight.

Notwithstanding the general purpose, a person may want to know their weight after a certain period of time, or after gaining or losing some amount of weight. In some examples, the weigh scales and methods described herein may have an option for indicating total weight. In these examples, the option for indicating total weight may be left inactive unless a user explicitly activates the total weight measurement option. This may reduce the possibility that the weigh scale or methods may accidentally indicate the person's total weight.

While the above description provides examples of one or more processes or apparatuses, it will be appreciated that other processes or apparatuses may be within the scope of the disclosure. It will also be understood that the processes and apparatuses may be implemented using hardware or software components or an appropriate combination thereof. Software may be provided on a physical computer medium or the like for execution on a processor (e.g. control system 30 in some embodiments).

As an example, the weigh scales described herein may be configured to play music while the user is on the weigh scale and prior to or after indicating a result rather than only at the time of indicating the result. Similarly, the weigh scales could be configured to provide motivational indications prior to or after indicating a result to the user.

As a further example, there are some users that may be more interested in gaining weight and keeping that weight on. The principles described above could equally apply to a weigh scale configured to motivate a person to gain weight in a similar fashion.

We claim:

1. A weigh scale comprising:
   a weighing mechanism;
   a recording system connected to the weighing mechanism for recording a weight;
   a comparator connected to the weighing mechanism and the recording mechanism for determining a difference between weights; and
   an indicator in communication with the comparator for indicating a difference in weights,
   the weighing mechanism, recording system, comparator and indicator configured to:
   determine if a reset is requested by a subject;
   measure an initial weight or a reset weight of the subject without indicating the weight and store the weight in the recording system;
   measure a subsequent weight of the subject without indicating the weight;
   determine a difference between the initial or the reset weight and the subsequent weight; and
   indicate the difference in weight between the initial or the reset weight and the subsequent weight only when the subsequent weight is one of greater or less than the initial or the reset weight.

2. A weigh scale according to claim 1, wherein the weighing mechanism, recording system, comparator and indicator are further configured to indicate an encouraging message when the subsequent weight is the other of greater than or less than the initial or the reset weight.

3. A weigh scale according to claim 1, wherein the weighing mechanism, recording system, comparator and indicator are further configured to prevent the measuring of a subsequent weight until a predetermined time has elapsed.

4. A weigh scale according to claim 1, wherein the weighing mechanism, recording system, comparator and indicator are further configured to indicate the difference in weight using a non-numerical system.

5. A weigh scale according to claim 1, wherein the weighing mechanism, recording system, comparator and indicator are further configured to indicate the difference in weight using a non-numerical system only until a predetermined value is reached.

6. A weigh scale according to claim 1, wherein the weighing mechanism, recording system, comparator and indicator are further configured to reset the initial weight to a new value on reaching a predetermined difference in weight.

7. A weigh scale according to claim 1, wherein the indicator is provide remotely from the weighing mechanism.

8. A method of monitoring a weight of a subject, the method comprising:
   determining if a reset is requested by the subject;
   measuring an initial or a reset weight of the subject without indicating the weight;
   measuring a subsequent weight of the subject without indicating the weight;
   determining a difference between the initial or the reset weight and the subsequent weight; and
   indicating the difference in weight between the initial or the reset weight and the subsequent weight only when the subsequent weight is one of greater or less than the initial or the reset weight.

9. A method of monitoring a weight of a subject according to claim 8, wherein, when the subsequent weight is the other of greater than or less than the initial or the reset weight, indicating an encouraging message.

10. A method of monitoring a weight of a subject according to claim 8, further comprising preventing the measuring of a subsequent weight until a predetermined time has elapsed.

11. A method of monitoring a weight of a subject according to claim 8, wherein the difference in weight is indicated using a non-numerical system.

12. A method of monitoring a weight of a subject according to claim 8, wherein the difference in weight is indicated using a non-numerical system only until a predetermined value is reached.

13. A method of monitoring a weight of a subject according to claim 8, further comprising resetting the initial weight to a new value on reaching a predetermined difference in weight.

14. A computer-readable medium storing executable program instructions, wherein the executable program instructions, when executed by a computer processor, cause the processor to:
   determine if a reset is requested by a subject:
   measure an initial or a reset weight of the subject without indicating the weight;

measure a subsequent weight of the subject without indicating the weight;

determine a difference between the initial or the reset weight and the subsequent weight; and indicate the difference in weight between the initial or the reset weight and the subsequent weight only when the subsequent weight is one of greater or less than the initial or the reset weight.

15. A computer-readable medium according to claim 14, further comprising instructions which cause the processor to indicate an encouraging message when the subsequent weight is the other of greater than or less than the initial or a reset weight.

16. A computer-readable medium according to claim 14, further comprising instructions which cause the processor to prevent the measuring of a subsequent weight until a predetermined time has elapsed.

17. A computer-readable medium according to claim 14, further comprising instructions which cause the processor to indicate the difference in weight using a non-numerical system.

18. A computer-readable medium according to claim 14, further comprising instructions which cause the processor to indicate the difference in weight using a non-numerical system only until a predetermined value is reached.

19. A computer-readable medium according to claim 14, further comprising instructions which cause the processor to reset the initial weight to a new value on reaching a predetermined difference in weight.

20. A computer-readable medium according to claim 14, further comprising instructions which cause the processor to send one of the subsequent weight or the difference in weight to an electronic patient record.

\* \* \* \* \*